No. 808,795. PATENTED JAN. 2, 1906.
E. L. WHITE.
BALING PRESS.
APPLICATION FILED JUNE 30, 1903.
2 SHEETS—SHEET 2.
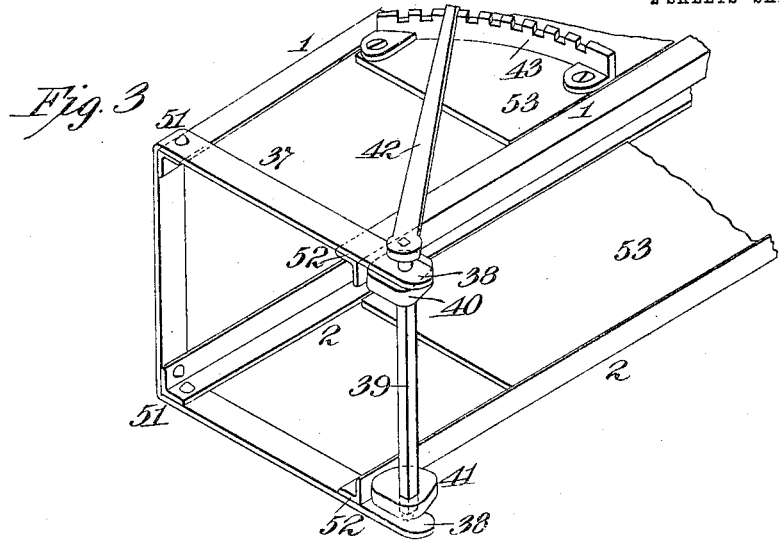
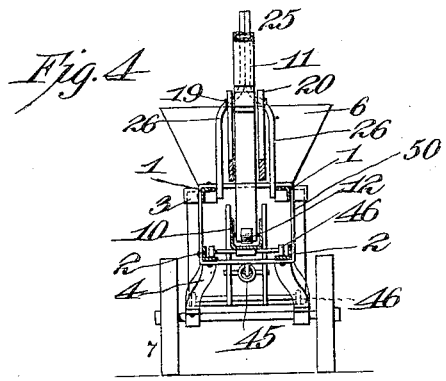
Witnesses:
Jas. F. Coleman
Jno. Robt Taylor
Inventor
Edgar Lee White
By Dyrenforth
Attorneys

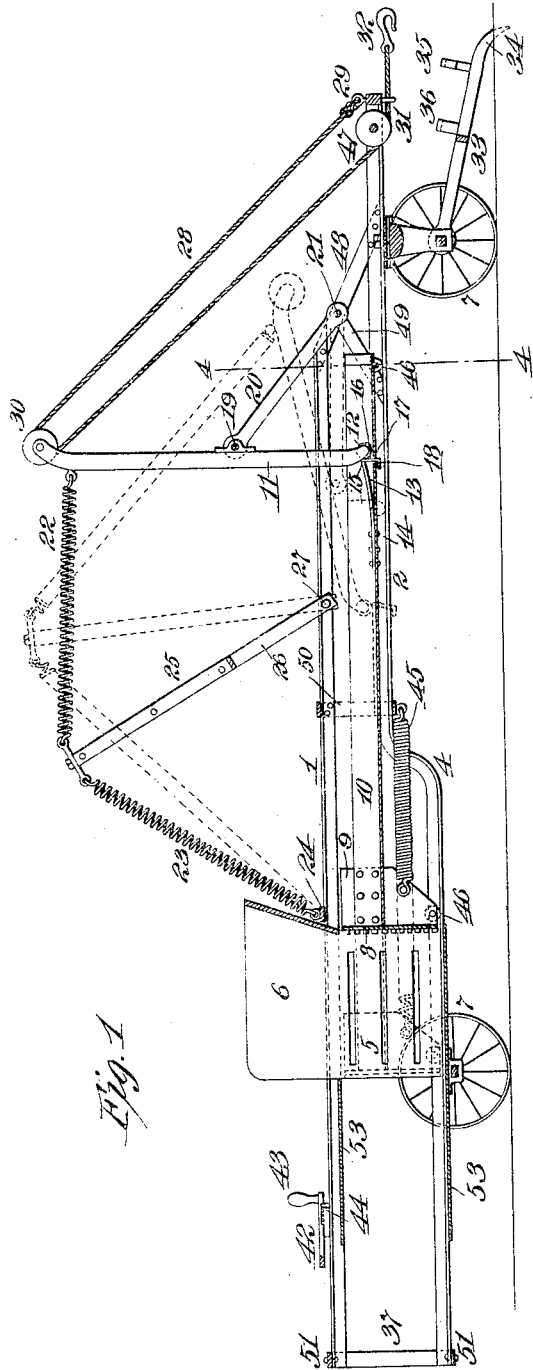

UNITED STATES PATENT OFFICE.

EDGAR LEE WHITE, OF WACO, TEXAS.

BALING-PRESS.

No. 808,795.  Specification of Letters Patent.  Patented Jan. 2, 1906.

Application filed June 30, 1903. Serial No. 163,752.

*To all whom it may concern:*

Be it known that I, EDGAR LEE WHITE, a citizen of the United States, residing in the city of Waco, county of McLellan, and State of Texas, have invented a certain new and useful Improvement in Baling-Presses, of which the following is a description.

The present invention relates to improvements in baling-presses of that type in which a rectangular bale of hay or other material is formed in increments within a chamber by means of a reciprocating plunger, and more particularly relates to a press of that type in which the plunger is actuated by a system of levers and a tackle to which the team of draft-animals is attached. The action of the team is straight away and intermittent and differs from the more common form of press in which the movement is circular and continuous. Presses of this type have hitherto been formed almost entirely of wood, and one form consists of a wheeled framework upon which a horizontal rectangular box is mounted. Within this box is a plunger, which is caused to reciprocate within the baling-chamber and below the hopper by means of a vertical plunger-lever supported by pivoted links, which form a floating fulcrum and engaging within a notch on the horizontal plunger-rod. The free extremity of the lever carries a number of pulleys, which form part of the tackle to which the team is attached. The lever is retracted and the tackle overhauled by means of a spiral spring attached to an elevated structure carried by the box. The tongue attached to the front axle is very short and is so arranged that it may drop down, permitting a hook or spike which is at its front end to become embedded in the ground and serve as an anchor to resist the pulling effect of the team upon the press. In operation the press may be moved about by engaging the bight of the rope with a hook on the top of the tongue, which serves to elevate it and permits the team to draw the press about the hay-field from one haycock to another. By disengaging the rope from the tongue and allowing the latter to engage with the ground the press may be operated without in any way dismantling or changing it. The bale is formed by the reciprocating action of the plunger, the team through the agency of the tackle lowering the plunger-lever against the tension of its retracting spring and to such an extent that the free end of the lever will become disengaged from the notch, whereupon the plunger will be returned to its initial position by means of a suitable spring.

A press of the above-described form and unmodified I find to be subject to numerous disadvantages. In the first place, being formed almost entirely of wood it is too heavy to be conveniently moved about the hay-field. Furthermore, a wooden construction is not sufficiently strong for practical purposes. This objection I overcome by making the press of metal and of a novel form. Another disadvantage lies in the use of the lever-retracting spring, which, unless it is made extremely heavy, will not return the plunger-lever to the vertical position and properly overhaul the tackle. Its failure to accomplish this I believe to be due to the fact that the angle of pull of the spring is too acute at the initial stage of the return movement of the lever. This cannot be remedied by elevating the anchored end of the spring, for by doing so the angle of pull thereof would be too acute when the lever approaches the vertical position. This objection I overcome by providing a movable bridge and dividing the spring into two parts, so that the angle of pull will be automatically changed to suit the varied angular positions of the lever and spring.

Another objection to the before-described press lies in the means for releasing the lever from engagement with the plunger-beam. I have found in practice with a press of this type that the lever does not readily slip out of the notch formed within the beam, but, on the contrary, it takes a great expenditure of power to do this, requiring in some cases as much power to release the lever from the notch as it does to compress the hay. For that reason it is necessary to use a very powerful tackle. One requiring the use of four sheaves I have found to be necessary in practice. This objection I avoid by using a spring-actuated detent formed upon the plunger-tongue with which the free end of the plunger-lever engages in lieu of the notch in the usual form of press. This detent is so formed that at the proper point in the travel of the plunger the engaging end of the plunger-lever will depress it and permit the plunger to be retracted, which action may be facilitated by providing a roller upon the free extremity of the plunger-lever. Another objection to this press which I seek to avoid is caused by the plunger-lever sometimes slipping to one side of the plunger-tongue by reason of the latter being narrow and flat on top. This objection I overcome by forming the plunger-tongue of sheet metal formed in the shape of a trough or deep channel, in the bottom of which is carried the spring-detent and which by its peculiar form absolutely prevents the lower extremity of the plunger ever becoming disengaged. Another objection lies in the inability to secure a sufficient length of stroke without making the lever and supporting-links unduly long. This I overcome by lowering the pivotal point of the links and placing them upon a plane more nearly approaching the plunger-tongue.

Another object of the invention is to provide means for adjusting and varying the pressure of the forming-blade, and this I accomplish by a novel form of discharging end device, as will more fully appear.

In order to better understand the nature of the invention, attention is called to the accompanying drawings, forming part of this specification, and in which—

Figure 1 is a longitudinal section of the complete press. Fig. 2 is a top view thereof; Fig. 3, a perspective view showing details of the tension-adjusting mechanism, and Fig. 4 a transverse section taken on the lines 4 4 of Fig. 1.

In all of the several views like parts are designated by the same figures of reference.

The framework of the press consists of a horizontal rectangular skeleton frame formed of angle members, preferably of steel angle-irons, and is composed of the top members 1 1 and the bottom members 2 2, the former being bent outwardly at 3 to accommodate the hopper and compressing-chamber. The lower members are bent outwardly and downwardly at 4 for the same purpose and also to allow the front part of the frame to be elevated sufficiently to form a support for the plunger-tongue and to permit the front wheels to cut under while the vehicle is being turned. The baling-chamber 5 and hopper 6 are formed of wood or metal, as is common in the art, and are secured between the top and bottom members intermediate their ends. The baling-chamber serves to strengthen the frame. Top and bottom plates 53 are employed to support the bale after it leaves the baling-chamber and to prevent it expanding. A cross member 24 and continuous band 50 also serve to strengthen the frame, while the supporting-wheels 7 are preferably of steel. The lower side members 2 are brought quite near together at 47 to form a bearing for the lower sheave, as will be subsequently described. Adjacent to the front of the frame the lower side members are connected to the upper members by the inclined pieces 48, which may be formed continuous with the top members 1 1 and are strengthened intermediate their ends by means of the inclined braces 49. This construction forms a light, but very strong framework, to which the moving devices are attached.

The plunger 8 has formed upon it two ears 9, between which is bolted the plunger-tongue or rod 10. This latter is formed of trough or deep-channel shaped metal, having a bottom and parallel side flanges and a seat formed between the flanges, within which the free end of the plunger-lever 11 travels. The plunger is provided, if desired, with antifriction-rolls 46 46, which run upon the inturned flanges of the lower side members 2 2, and has attached a retraction spiral spring 45, one extremity of which is secured to the frame of the press. The lower extremity of the plunger-lever is provided with an antifriction-roller 12, which engages with the bottom of the trough-shaped plunger-tongue 10 and abuts against the spring-engaged detent 13. This detent may be formed of metal and may be pivoted to the plunger-tongue and normally elevated by means of a spring, but is preferably formed in the manner illustrated and about to be described. In the preferred construction the detent and elevating-spring are combined, the device being formed of a plate of elastic metal, having one extremity riveted or otherwise secured at 14 to the inside of the plunger-tongue, with its other extremity bent at right angles at 15 to form a depending portion or shoulder 16, which engages with the lower extremity of the plunger-lever. This portion 16 passes through a slot 17 in the plunger-tongue and is bent again at right angles at 18, forming a head which prevents the detent from being accidentally lifted out of the opening 17 by the elevating action of the plunger-lever as the latter approaches the horizontal position. The plunger-lever is pivoted at 19 to two links 20 20, which in turn are pivoted at 21 near the front part of the press-frame, preferably at the point where the braces 49 are secured to the inclined front members 48. This construction permits of a more powerful stroke being given to the plunger because it places the pivoting-point 21 of the links 20 more nearly in line with the center of travel of the plunger and also admits of a longer stroke of the plunger. The plunger-lever is retracted and returned to the vertical position for the beginning of a stroke by means of a coil-spring so connected in a novel manner that it will elevate the lever with a minimum amount of power. This means consists of a pivoted bridge which engages with the spring intermediate its ends and lifts the middle part above the points of connection with the frame and lever. To permit the bridge being connected with the spring, the latter is formed in two parts 22 23, the part 23 being connected with the cross-bar 24 at the base of the hopper 6, and both springs being connected with the intermediate bridge 25. This latter is provided with a bifurcated lower portion forming legs 26, which are pivoted at 27 to the top members 1 of the press-frame. This bridge is free to move upon its pivot, and by elevating the springs 22 23 it always gives them a proper lead to the plunger-lever 11, so that the latter may be readily elevated from the nearly horizontal position it will assume at the end of the stroke. It is to be noted that the bridge will move upon its pivot and will constantly change its position relative to the press-frame and plunger-lever as the latter is elevated or depressed.

The operating-tackle is formed of a rope 28, attached at 29 to the forward end of the frame and passing around a single sheave 30 upon the outer extremity of the plunger-lever and through a guide-sheave 31, pivoted within the slot formed upon the forward end of the frame by the side members 2 2 at 47. At the free extremity of the rope is a hook 32, to which is attached the team of draft-animals. A draft-tongue 33 is used with a downwardly-extending hook 34 on its forward extremity and which may be embedded in the ground, and thus serve as an anchor to keep the press stationary while it is in operation. This tongue may be elevated when the press is to be transported by engaging a portion of the rope 28 below a hook 35, formed upon the tongue. This will suffice for moving the press about the hay-field; but for longer trips a pole of the usual length may be employed which may be attached to the tongue 33 by being inserted and secured within the mounting 36 and hook 35.

The tension device by means of which the extent of opening at the rear of the press may be varied and the pressure upon the forming bales controlled consists in means for simultaneously drawing the top and bottom members 1 and 2 of the press-frame together or separating them at will. This means consists of a continuous strap 37, passing around three sides of the frame and extending a short distance beyond a top and bottom member 1 2, where it is provided with bearings 38 38. The strap is secured at 51 51 to the side members, but at 52 52 it merely bears against them. Mounted in the bearings 38 38 is a shaft 39, adjacent to the extremities of which are rigidly secured two cams 40 and 41, which engage, respectively, with a top and bottom member 1 and 2 of the press-frame. The construction of the cams is such that upon the shaft 39 being partly rotated the side members of the frame will be drawn together at this point through the agency of the strap 37. For the purpose of imparting the necessary rotary motion to the shaft 39 a lever 42 is provided having an operating-handle 43. This lever engages with a fixed rack 44, secured to the press-frame adjacent to the feeding-hopper, so that its position may be definitely determined and fixed. The handle 43 is preferably arranged so that it may be actuated by the same person who feeds the hay to the hopper, so that the tension may be readily varied as occasion requires.

The operation of the press is as follows: It is first brought by its team of draft-animals to a position adjacent to a hay-cock. The draft-pole being removed, the tongue 33 is allowed to drop, so that the hook 34 will engage with the ground and serve as an anchor and prevent the team from moving the press. The hopper and the press-chamber are then filled with the necessary quantity of hay to make one charge, and upon the team being started forward the lever 11 will be depressed against the tension of the springs 22 and 23 and 45, which action will move the plunger-tongue 10, and with it the plunger 8, into action. Upon the lever 11 reaching the full extent of its travel, as indicated in dotted lines in Fig. 1, its free end 12 will slip above and depress the spring-detent 13 and will be released from engagement therefrom, whereupon the plunger-tongue will be retracted by the spring 45. The team is then backed, permitting the springs 22 and 23 to elevate the lever 11, keeping the whiffletrees clear of the ground, the bridge 25 moving about its pivot and serving to cause the springs to always have the most advantageous angle of lead. As the lever 11 approaches the perpendicular position it engages with the inclined tip of the detent 13, depressing the latter and allowing the roller 12 to pass over the same. Upon the lever reaching the perpendicular position the elasticity of the detent will elevate it in position for engagement again with the lever, so that another stroke may be taken.

By the use of the bridge 25 much smaller and lighter springs may be used than if it were not employed, and this bridge, together with the roller 12 and the spring-detent 13, combined with the feature of pivoting the links at a lower plane than the top of the frame, permit a less powerful tackle to be used. By this construction the team of draft-animals has to travel less than half the distance it would if such devices were not used.

It is of course to be understood that in lieu of the two springs 22 and 23 a single spring may be used, the bridge in this case engaging with the spring intermediate its ends.

What I claim is—

1. In a baling-press, the combination with a plunger, plunger-rod, and plunger-operating mechanism; of a main frame including a baling-chamber, a frame extension comprising opposite-flanged metallic beams, rollers supporting the plunger, and other rollers supporting the plunger-rod and disposed to travel along the bottom flanges of said beams.

2. In a baling-press, the combination with a press-box and plunger; of plunger-operating mechanism including a lever and lever-retracting mechanism including a pair of springs having their remote ends connected to the lever and to a fixed part respectively, and a swinging arm connecting the proximate ends of said springs.

3. In a baling-press, the combination with a press-box, plunger and plunger-rod; of a swinging fulcrum-support, a plunger-operating lever fulcrumed in said support and disposed to engage the plunger-rod, a swinging arch, a spring connecting said arch with the lever, and a second spring extending between the arch and a fixed part.

4. In a baling-press, the combination with the top members 1, 1 bent outward intermediate their ends for the reception of the baling-chamber, of bottom members 2, 2, bent outward intermediate their ends, for the reception of the baling-chamber and upward near the front ends to form a base or platform for the baling-tongue, substantially as and for the purposes set forth.

5. In a baling-press, the combination with the top members 1, 1 bent outward intermediate their ends for the reception of the baling-chamber, of bottom members 2, 2, bent outward intermediate their ends, for the reception of the baling-chamber and upward near the front ends to form a base or platform for the baling-tongue and brought into close relation at the front extremity to form a sheave-bearing, substantially as and for the purposes set forth.

6. In a baling-press, the combination with the top members 1, 1 bent outward intermediate their ends for the reception of the baling-chamber, of bottom members 2, 2, bent outward intermediate their ends, for the reception of the baling-chamber and upward near the front ends to form a base or platform for the baling-tongue and the inclined members 48 and braces 49, substantially as and for the purposes set forth.

7. In a baling-press, the combination with the top members 1, 1 bent outward intermediate their ends, for the reception of the baling-chamber, of bottom members 2, 2, bent outward intermediate their ends, for the reception of the baling-chamber and upward near the front ends to form a base or platform for the plunger-beam and brought into close relation at the front ends to form a sheave-bearing, and the inclined members 48 and braces 49 with the bearing 21 at the meeting-point thereof, substantially as and for the purposes set forth.

8. In a baling-press, the combination with the framework, plunger-actuating lever and retracting-springs therefor, of the bridge pivoted to the framework, and engaging with the springs intermediate the frame and plunger-actuating lever whereby the angle of lead of the springs will automatically change as the plunger-actuating lever moves, substantially as and for the purposes set forth.

9. In a baling-press, the combination with the framework, plunger-actuating lever and retracting-springs therefor, of a bridge with bifurcated ends pivoted to the framework, and engaging with the springs intermediate the frame and plunger-actuating lever whereby the angle of lead of the springs will automatically change as the plunger-actuating lever moves, substantially as and for the purposes set forth.

10. In a baling-press, the combination with a plunger-beam and actuating-lever, of a spring-detent on the plunger-beam adapted to engage with the plunger-actuating lever, substantially as and for the purposes set forth.

11. In a baling-press, the combination with the plunger-beam and actuating-lever, of a spring-detent upon the beam, and an antifriction-roller on the lower extremity of the actuating-lever, and adapted to engage with the detent, substantially as and for the purposes set forth.

12. In a baling-press, the combination with the plunger-beam and actuating-lever, supporting-links for the latter, a spring-detent upon the beam and an antifriction-roller on the lower extremity of the actuating-lever and adapted to engage with the detent, substantially as and for the purposes set forth.

13. The combination with the plunger and plunger-beam of a baling-press, of a frame with side members of angle-irons forming a central portion larger in cross-section than the plunger, and contracted inwardly and upwardly adjacent to one end, to form a support for the beam, substantially as and for the purposes set forth.

14. The combination with the plunger and plunger-beam of a baling-press, of a frame with side members of angle-iron forming a central portion larger in cross-section than the plunger, and contracted inwardly and upwardly adjacent to one end, to form a support for the beam, and means for adjustably contracting the other end of the frame, substantially as and for the purposes set forth.

15. In a baling-press, the combination with a press-box and plunger, of a plunger-rod in the form of a channel-beam having a bottom and parallel side flanges, a seat formed between the flanges and an operating-lever having its end extending between the flanges of the plunger-rod and engaging the seat.

This specification signed and witnessed this 16th day of May, 1903.

EDGAR LEE WHITE.

Witnesses:
 W. D. MAYFIELD,
 I. J. MAYFIELD.